United States Patent [19]

Scholl et al.

[11] Patent Number: 4,561,091
[45] Date of Patent: Dec. 24, 1985

[54] DATA RECEIVER

[75] Inventors: Frederick W. Scholl, Riverdale; Michael H. Coden, New York, both of N.Y.

[73] Assignee: Codenoll Technology Corporation, Yonkers, N.Y.

[21] Appl. No.: 534,967

[22] Filed: Sep. 23, 1983

[51] Int. Cl.$^4$ .............................. H04J 3/02; H04J 3/00; H04J 6/00
[52] U.S. Cl. .............................. 370/85; 370/93; 340/825.5
[58] Field of Search ................... 370/85, 94, 93; 340/825.5

[56] References Cited

U.S. PATENT DOCUMENTS

| | | | |
|---|---|---|---|
| 4,063,220 | 12/1977 | Metcalfe et al. | 370/93 |
| 4,071,826 | 1/1978 | Miller, Jr. et al. | 370/93 |
| 4,376,278 | 3/1983 | Jacobsthal | 370/85 |
| 4,380,761 | 4/1983 | Boggs | 370/85 |
| 4,409,592 | 10/1983 | Hunt | 370/85 |

Primary Examiner—Douglas W. Olms
Assistant Examiner—Wellington Chin
Attorney, Agent, or Firm—Pennie & Edmonds

[57] ABSTRACT

A data communication receiver that provides very low pulse distortion at excellent sensitivity over a wide range of optical signal levels and simplified circuitry for the detection of data collisions. The receiver comprises an amplifier having a series of stages, all but one of which is directly coupled to the preceding stage and one of which is capacitively coupled by a capacitor that also functions as part of an RC differentiator. The output of the amplifier is a series of peak signals that are applied to a Schmitt trigger, the output of which is applied to a collision detection circuit. In a preferred embodiment of the invention, the collision detection circuit comprises a timing circuit for producing an output signal for a period of time equal to the longest interval during which a received data signal can have a first polarity and means for comparing the timing output signal with the received data signal and for producing a collision detection signal when the received data signal fails to change within the duration of the output signal from the timing means. To ensure that the Schmitt trigger produces an initial output representative of the absence of a signal in the communication medium, the amplifier is biased so that the initial output of the Schmitt trigger is low.

12 Claims, 4 Drawing Figures

DATA RECEIVER

BACKGROUND OF THE INVENTION

This relates to data communication equipment and in particular to a data receiver particularly useful in a data communication system in which more than one data communication message may be provided simultaneously to the same data transmission line.

U.S. Pat. No. 4,063,220 describes a multipoint data communication system, commonly referred to as an "Ethernet" system, in which two or more data processing stations are interconnected by a common communication cable. At each station a tap in the communication cable is connected by a transceiver to an appropriate interface to station equipment. The communication system permits each station to access the data communication cable so as to transmit messages to other stations connected to the same cable. Because the stations are independently operated, more than one station may attempt to use the cable substantially simultaneously. Equipment is provided, however, in each transceiver to detect such a data collision between a signal being transmitted from that transceiver and a signal already on the communication cable and to abort the data transmission.

Numerous techniques are known in the art for detecting a data collision. In the '220 patent, an exclusive OR gate compares the transmitted signal with the signal received from the communication cable and aborts transmission when they are not the same. Another technique is to monitor the DC level of the received signal and, if this level is higher than a specified threshold, assume there is a data collision and shut down the transmitter. Alternatively, as disclosed, for example, in U.S. Pat. No. 4,282,512, the receiver can look for data transitions that occur at timings different from those expected for the received data.

All of these techniques have their limitations. They miss collisions that start simultaneously or within the timing tolerances allowed for by the receiver. They also cannot detect very low signal levels that may well occur if the colliding data stream has been transmitted a relatively long distance and/or through several repeaters. Other difficulties with presently available receivers include unduly complicated collision detection circuitry, ambiguities in the turn-on state of this circuitry which may be randomly high or low and the inability to comply with standards such as the single power supply requirement of the Ethernet standard.

SUMMARY OF THE INVENTION

We have devised an improved data communication receiver that provides simplified circuitry for the detection of data collisions and at the same time provides very low pulse distortion at excellent sensitivity over a wide range of optical signal levels. In accordance with our invention, the receiver comprises an amplifier comprising a series of stages, all but one of which is directly coupled to the preceding stage and one of which is capacitively coupled by a capacitor that also functions as part of an RC differentiator. The output of the amplifier is a series of peak signals that are applied to a Schmitt trigger, the output of which is applied to a collision detection circuit. In a preferred embodiment of the invention, the collision detection circuit comprises a timing circuit for producing an output signal for a period of time equal to the longest interval during which a received data signal can have a first polarity and means for comparing this output signal with the received data signal and for producing a collision detection signal when the received data signal fails to change within the duration of the output signal from the timing circuit. In addition, in order to ensure that the Schmitt trigger produces an initial output representative of the absence of a signal in the communication medium, the amplifier is biased so that the initial output of the Schmitt trigger is low.

This receiver provides very low pulse distortion (2 to 3 nanoseconds) over a wide range of optical signal levels (about 17 db optical power) and duty cycles with excellent sensitivity of about 1 to 1.5 µW. In addition, the receiver operates from a single +5 volt power supply, consistent with the Ethernet standard.

BRIEF DESCRIPTION OF DRAWINGS

These and other objects, features and elements of the invention will be more readily apparent from the following detailed description of a preferred embodiment of the invention which.

DETAILED DESCRIPTION OF PREFERRED EMBODIMENT

Figure 1:
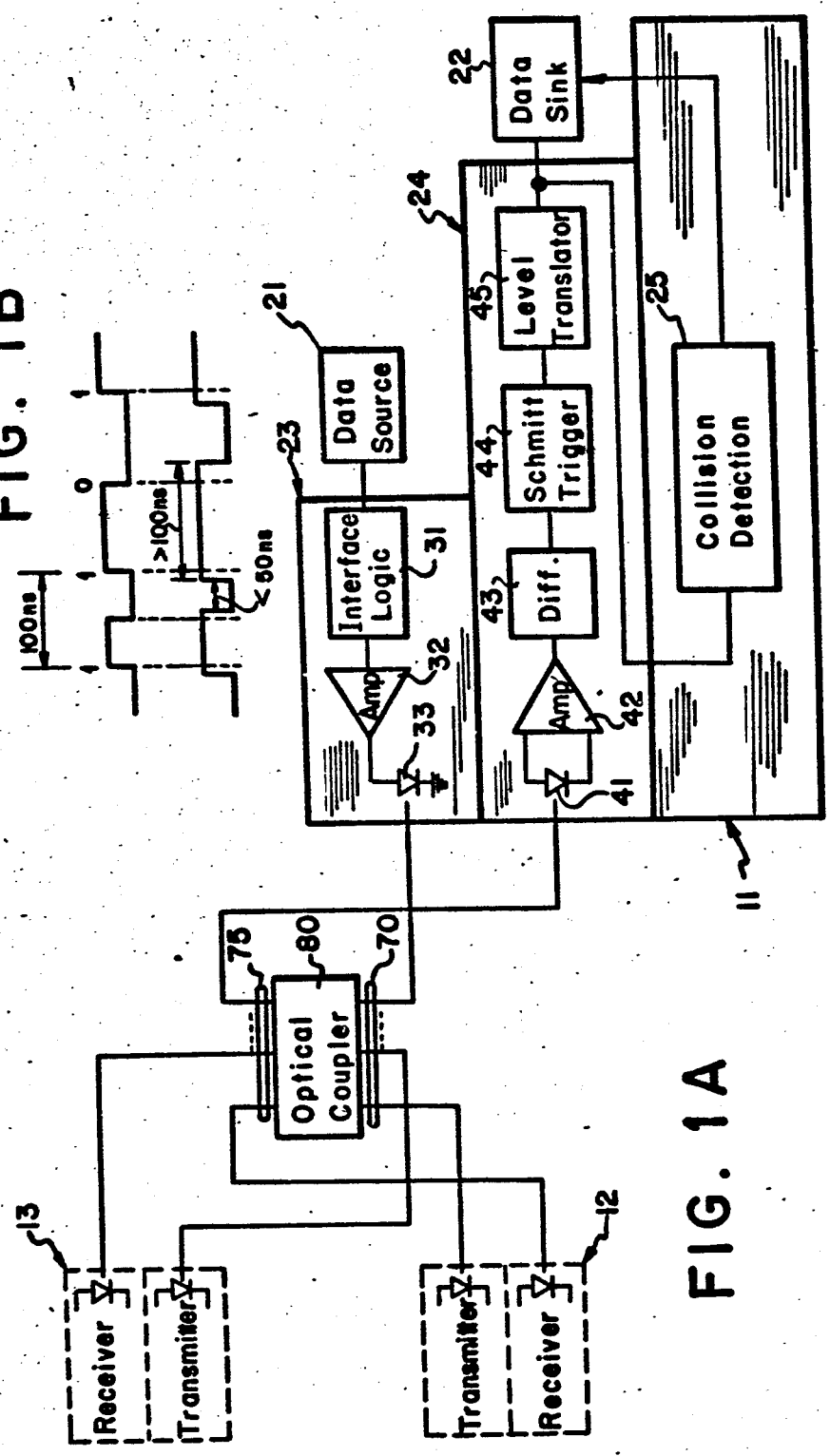
FIG. 1A a schematic drawing of the preferred embodiment of a data communication system of the invention.
FIG. 1B depicts illustrative signal waveforms found in the data communication system of FIG. 1A.

As shown in FIG. 1A, a preferred embodiment of the data communication system of the present invention comprises a plurality of data transmission stations 11, 12, 13 that are interconnected by first and second arrays 70, 75 of unidirectional optical fibers and a transmissive star coupler 80. Each station comprises a data source 21, a data sink 22, a transmitter 23, a receiver 24, and a collision detection circuit 25. Data source 21 may be any source of data such as a computer terminal, a communication line, a visual, audible or tactile input, a disk file or a combination thereof. Data sink 22 may be any sink of data such as a computer terminal, a communication line, a display, a printer, a plotter, a mechanical device, a disk file or a combination thereof.

Transmitter 23 comprises a logic interface 31, an amplifier and LED driver 32 and an LED (light emitting diode) 33. Receiver 24 illustratively comprises a photodetector 41, an amplifier 42, a differentiator 43, a Schmitt trigger 44 and a level translator 45. Transmitter 23 and receiver 24 together constitute a transceiver. Optical transmitter circuits such as circuit 23 are known in the art and are not part of the present invention. The optical receiver circuit is described in greater detail in conjunction with FIG. 2. Collision detection circuit 25 is described in conjunction with FIG. 3.

As shown in FIG. 1A, each of stations 11, 12 and 13 are interconnected by means of optical fibers 70, 75 and transmissive star coupler 80. Illustratively the optical fibers are multi mode optical fibers having a core diameter of approximately 100 microns and a cladding of approximately 140 microns. The transmissive star coupler is a known device being described, for example, in E. G. Rawson and R. M. Metcalfe, "Fibernet: Multimode Optical Fibers for Local Computer Networks," *IEEE Transactions in Communications*, Vol. COM-26, No. 7, p. 983 (July 1978).

Illustratively, data is transmitted through fibers 70, 75 in "Bi-Phase L" encoding in which there is a signal transition once per bit cell and its direction is the value of the bit. In particular, as shown in FIG. 1B, a low to high transition represents a one and a high to low transition represents a zero. Typically, a high signal corresponds to the presence of optical energy in the fiber and a low signal corresponds to the absence of optical energy. Midway between adjacent signal transitions it may be necessary to have a set up transition so that the next data transition is in the correct direction. In particular, a set up transition is needed whenever it is necessary to generate two successive bits having the same state. Further details concerning such encoding are set forth in U.S. Pat. No. 4,282,512 which is incorporated herein by reference.

As will be apparent from the foregoing discussion and from FIG. 1B, signals will be high for either the duration of one bit cell or for one-half that duration, and signals will be low for either the duration of one bit cell or for half that duration. In the standard Ethernet system, the data rate can be as high as ten megabits per second (Mbps). At this speed, the longest normal duration of a high level is 100 nanoseconds (nsec.) and the shortest normal duration of a low level is 50 nsec.

In the event of a collision between two phase-encoded data streams, some logic "high" pulses in the combined data stream will be longer than the longest normal value and some of the logic "low" pulses will be shorter than the shortest normal data interval. In accordance with the present invention, data collisions can be detected either by detecting high levels that are longer than the longest normal duration or by detecting low levels that are shorter than the shortest normal duration. Tolerances are normally provided to accommodate dispersion in the communication medium and asymmetries in the rise and fall times of the logic circuitry of the receiver. Thus, in the Ethernet system the maximum longest duration of a high level is 110 nsec. and the minimum shortest duration of a low level is 40 nsec. Accordingly, in practicing the present invention with Ethernet signalling protocols, the present invention monitors for high levels longer than 110 nsec. or low levels shorter than 40 nsec.

The present invention may be applied in any data communications system in which more than one data communications message may be provided simultaneously to the same data transmission line. However, it is especially useful in an optical transmission system because LED's have very sharp rise times and optical fibers have high bandwidths and low losses. As a result, pulse shapes show very little distortion or deterioration after traveling long distances so that it is possible to accurately recreate at a receiver the original pulse width of the transmitted data signal.

Figure 2:
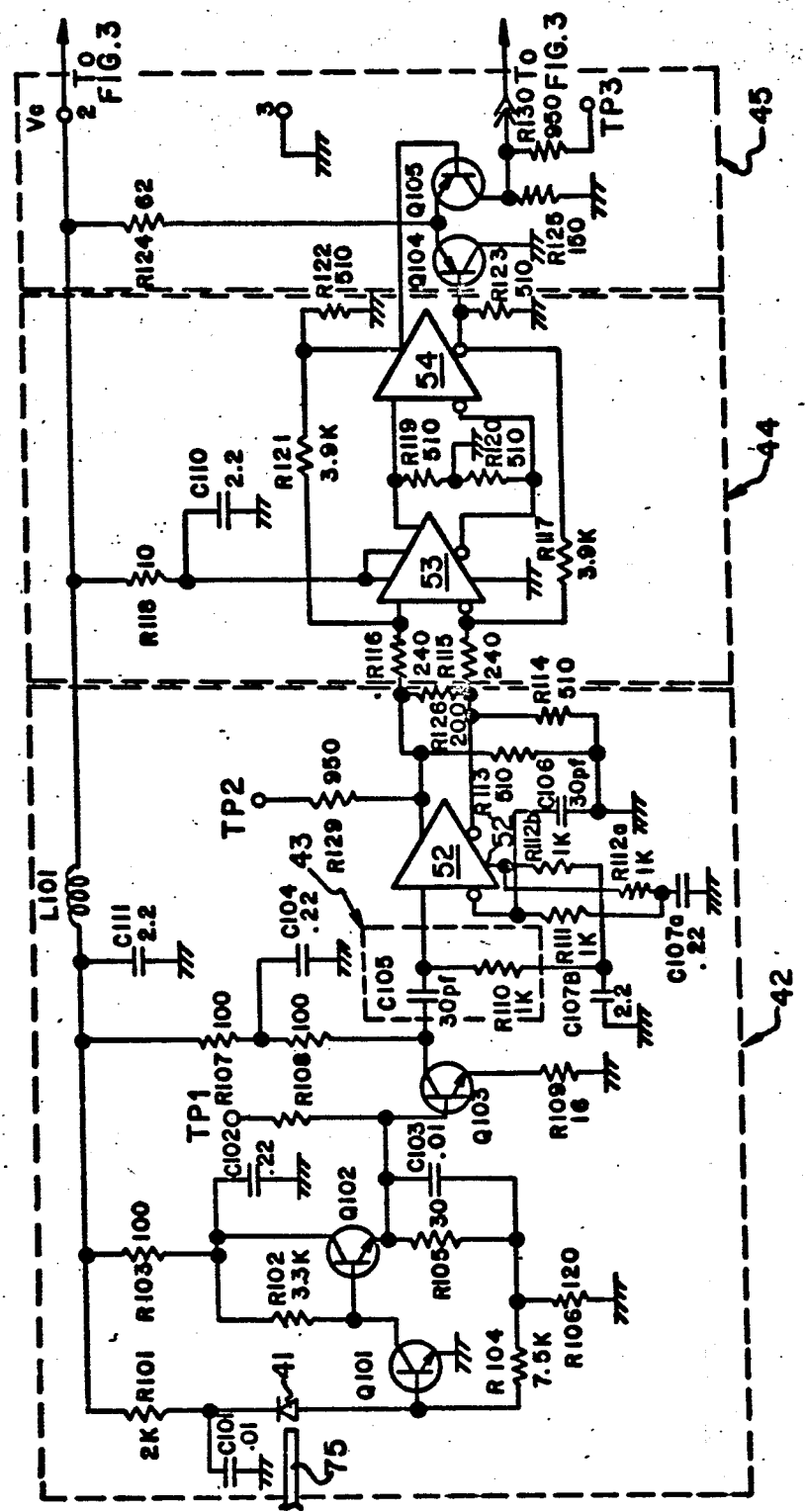
FIG. 2 is a schematic drawing of a preferred embodiment of a receiver of the present invention.

Circuit details of receiver 24 are depicted in the schematic diagram of FIG. 2. As shown therein, photodetector 41 is connected in series with resistors R101, R104 and R106 between a positive voltage supply Vc and ground. Illustratively, photodetector 41 is a p-i-n photodiode that converts the optical information carried by intensity variations in the light transmitted by the optical fiber into a current whose amplitude varies with the intensity of light incident on the photodetector.

The current produced by this photodetector is applied to the base of transistor Q101, which in conjunction with transistors Q102 and Q103, forms a current to voltage converter and amplifier. This converter/amplifier transforms the low level light sensed by the detector into an appropriate voltage level. Transistors Q101 and Q102 provide linear gain wherein the transimpedance gain of these transistors is equal to the value of resistor R104.

The bandwidth of the converter is primarily determined by the feedback resistance, $R_f$, and the equivalent capacitance, $C_{eq}$, where the resistance of resistor $R_{104}$ is the feedback resistance and the equivalent capacitance is given by:

$$C_{eq} = \frac{C_{b'e} + C_D}{g_m R_{102}} + C_f + C_{b'c}$$

where $C_{b'e}$ is the transistor base-emitter junction capacitance, $C_D$ is the photodiode capacitance, $C_f$ is the parasitic capacitance of the feedback resistor, $C_{b'c}$ is the base-collector junction capacitance, $g_m$ is the transistor transconductance and $R_{102}$ is the resistance of resistor $R_{102}$. The 3 db bandwidth $F_{3db}$ is given by:

$$F_{3db} = \frac{1}{2\pi R_f C_{eq}}$$

The high frequency response is limited mainly by $C_{b'c}$. Transistors Q1 and Q2 are chosen so that this quantity is as small as possible at the low operating voltages desired (5 volts = $V_c$).

The output voltage which appears at the emitter of transistor Q102 and which is proportional to the current produced by photodetector 41 is further amplified by transistor Q103 and its associated circuitry. The amount of amplification is set such that the output voltage produced by transistor Q102, when further amplified by amplifier/limiter 52, is sufficient to overcome the threshold level of Schmitt trigger 44. The operating point of transistor Q103 and its associated circuitry is fixed by the DC output level of the prior stage comprised of transistors Q102 and Q101. The gain of transistor Q103 is approximately equal to the value of resistor R108 divided by the value of resistor R109 plus the base-emitter resistance of transistor Q103. If the maximum data rate is on the order of 10 Mbps as in an Ethernet system, transistors of the type 734 (manufactured by NEC) can be used for transistors Q101, 102, 103.

Figure 3:
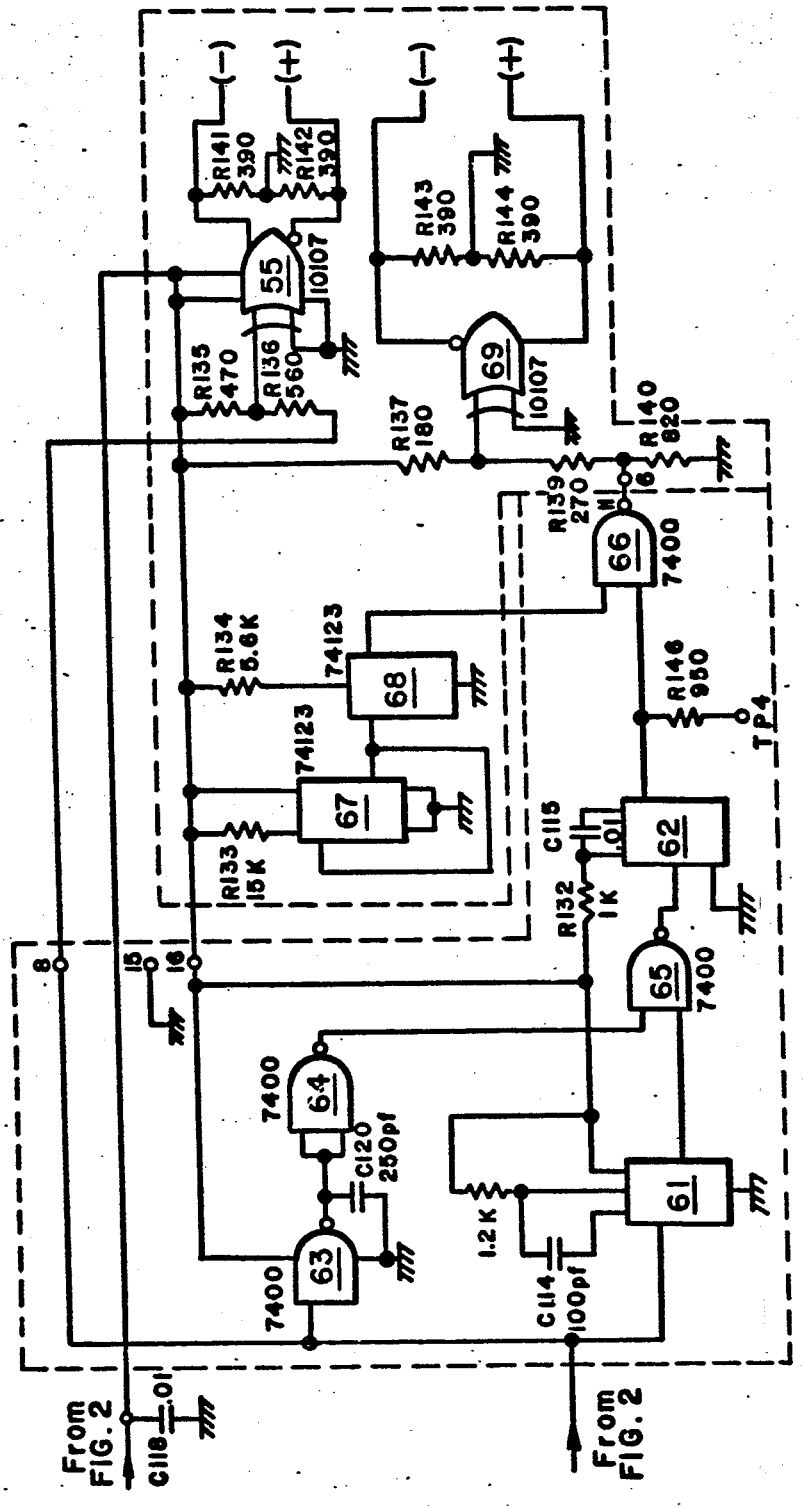
FIG. 3 is a schematic drawing of a preferred embodiment of a collision detect circuit of the present invention.

The output voltage produced by transistor Q103 is applied via capacitor C105 to amplifier/limiter 52. Capacitor C105 has two functions. First, it removes any DC component present in this output voltage from transistor Q103. Second, in conjunction with resistor R110 it functions as differentiator 43 to eliminate duty-cycle related base line variations in the incoming optical signal sensed by photodetector 41. The resulting signal is a series of positive- and negative-going peaks or edges, the timing and direction of which contain the information that is transmitted over the optical fiber. For the differentiator to function properly, the time constant of the differentiator (equal to the value of capacitor C105 multiplied by the value of resistor R110) must be set such that the differentiator only passes sharply differentiated edges of the data pulses appearing in the output of transistor Q103 and recovers (i.e. the capacitor discharges) between any adjacent data pulses. To ensure this, the time constant is set such that any differentiated edge decays by approximately two time constants before the expected arrival of the next successive edge. For example, if the incoming optical data rate is on the order of 10 Mbps Manchester encoded (which is equivalent to a non-return-to-zero (NRZ) data rate of 20 Mbps), then the time constant should preferably be set to approximately 25 nsec. As shown in the circuit of FIG. 3, a time constant of approximately 30 nsec. is adequate.

Amplifier/limiter 52 can be advantageously implemented using one section of an ECL (emitter coupled logic) line receiver chip wherein the voltage gain of this section is set to approximately 10. For a maximum optical data rate of 10 Mbps, the line receiver chip is preferably a Motorola type MC10116, and the values of the associated components, as shown in the figure, are chosen to establish a bandwidth of approximately 60 MHz for the amplifier/limiter. The configuration of amplifier/limiter 52 is such that it functions either as a small signal amplifier with a gain of 10 or a limiter, depending upon the level of the output voltage provided by transistor Q103. The output of the amplifier is a series of amplified positive- and negative-going peaks or edges.

The differentiated edges produced by the differentiator are applied in turn to the the Schmitt trigger 44 and the level translator and buffer 45. Each data pulse processed by differentiator 43 produces a pair of pulses which occur positively and negatively about a reference level that, in practice, tends to be quite noisy. To extract the duty cycle related information from these pulse pairs while providing a substantial amount of noise immunity, Schmitt trigger 44 is used to provide a hysteretic comparison of the voltage level of each differentiated edge with a threshold voltage. In particular, the output of the Schmitt trigger assumes a high ("1") state whenever the input voltage applied to the Schmitt trigger is equal to or above a certain threshold; an it maintains this high state until the input voltage applied thereto is equal to or less than the threshold less the hysteresis voltage. Likewise, once the Schmitt trigger has assumed a low state, it maintains this state until the input voltage is equal to or above the threshold. In the circuit shown in FIG. 2, the hysteresis voltage is approximately 50 milliVolts (mV).

Illustratively, the Schmitt trigger is formed using two previously unused sections of the same ECL line receiver chip which was partially used to implement amplifier/limiter 52 described above. The Schmitt trigger is implemented by applying the balanced outputs of a first section 53 to the inputs of a second section 54 and positively feeding-back a portion of the balanced output signals produced by the second section to the inputs of the first section. Resistors 117 and 121 are used to provide the feedback connection between these two sections and are chosen to have a value such that the amount of hysteresis provided by the Schmitt trigger is approximately 50 mV. For this amount of hysteresis, it is possible to attain a bit error rate of less than $1 \times 10^{-9}$ in the optical receiver.

The use of a Schmitt trigger has been observed to create a difficulty with respect to the initial state of the circuit. In particular, when the receiver is powered up, the output state is arbitrary and can be either high or low. In practice, it is desired that the output of the optical receiver be a logic low corresponding to the reception of no light from fiber 75. To this end, biasing circuitry is provided at the input to amplifier/limiter 52 so as to produce an output from the amplifier/limiter which ensures that the Schmitt trigger initially produces a logic low output. For the preferred embodiment of FIG. 2, the Schmitt trigger changes state when the voltage on a non-inverting input to first section 53 is more than 46 mV greater than the voltage on the inverting input. Since the gain of amplifier/limiter 52 is 10, a low output will be produced from the Schmitt trigger at turn-on if the voltage at the inverting input to amplifier/limiter 52 is at least 4.6 mV greater than the voltage at the non-inverting input to amplifier/limiter 52. In order to ensure this, a voltage reference pin 52' of amplifier/limiter 52 is connected by resistors R112a and R112b to capacitors C107a and C107b respectively. The voltage on capacitor C107 is applied by resistor R111 to the inverting input to amplifier/limiter 52 and the voltage on capacitor C107b is applied by resistor R110 to the non-inverting input to amplifier/limiter 52. By selecting the resistance and capacitance values of elements R112a, R112b, C107a and C107b so that the time constant R112b C107b is considerably greater than the time constant R112a C107a, the voltage on capacitor C107a will rise much more rapidly than that on capacitor C107b. In particular, the voltage difference between these two capacitors shortly after turn-on will be sufficient to ensure that the voltage at the inverting input to amplifier/limiter 52 is more than 4.6 mV greater than the voltage at the non-inverting input. As a result, Schmitt trigger 44 turns on with a logic low output.

The balanced outputs provided by the Schmitt trigger are, in turn, applied to level translator and buffer 45 comprising transistors Q104 and Q105. These transistors function as a level translator and current amplifier to convert the ECL outputs of the Schmitt trigger into standard TTL logic levels. For the latter levels, the level translator can sink a maximum of 2.6 mA without exceeding the standard TTL logic "low" level of 0.4 volts. Consequently, at the "encoded data" output of the level translator, a standard TTL compatible logic signal is provided which contains an electrical equivalent, in pulse code modulated form, of the information transmitted through the optical fiber and applied to the input of the optical receiver.

As shown in FIG. 3, the output of the level translator is then applied through resistor R136 to one input of an exclusive OR (XOR) gate 55 for further logic level shifting. The other input of the XOR gate is grounded. Non-inverted and inverted outputs from this XOR gate provide data output signals to data sink 22.

The output of the level translator is also applied to collision detection circuit 25 which illustratively is designed to detect logic high pulses that are too long. Collision detection circuit 25 comprises one shots 61, 62, NAND gates 63, 64, 65, 66 and one shots 67, 68. Each positive going edge of a data signal from level translator and buffer 45 triggers one shot 61 to produce an output pulse that is low for $100+\Delta$ nsec. where $\Delta$ is the timing tolerance allowed by the circuitry. For the Ethernet standard, $\Delta = 10$ nsec. The output of this one shot provides one input to NAND gate 65. The other input is the data signal from level translator and buffer 45 which has been delayed by NAND gates 63 and 64 an amount that is equal to the propagation delay of the one shot. As a result, at least one of the inputs to NAND gate 65 is ordinarily low and the output of NAND gate 65 is therefore high. If the received data is valid and there is no collision to be detected, the data applied to collision detection circuit 25 will go low approximately 50 nsec. after the positive going edge of data if the next bit of data is high, or approximately 100 nsec. after the positive going edge of data if the next bit of data is low. In either case, this does not change the output of NAND gate 65 which remains high. If, however, there is a data collision and the input data remains high for more than approximately 100 nsec., then the output of one shot 61 will revert to the high state after a period of approximately 100 nsec. thereby presenting NAND gate 65 with inputs that are both high. This will cause the output of NAND gate 65 to go low, indicating a collision.

The output of NAND gate 65 is applied to one shot 62 which produces a high output for a period such as seven microseconds whenever it receives a high to low transition at its input. The output of one shot 62 is applied to NAND gate 66 along with the output of one shots 67 and 68. One shots 67 and 68 are coupled together to provide a 10 MegaHertz (MHz) oscillator. As a result, whenever there is a collision, NAND gate 66 is enabled for seven microseconds to pass the 10 MHz signal generated by one shots 67, 68. This signal is applied to one terminal of exclusive OR gate 69 for logic level shifting. The other input terminal of this gate is grounded. Non-inverted and inverted outputs are provided from exclusive OR gate 69 to indicate the presence of a collision. The signals from exclusive OR gate 69 that indicate a collision may then be used in known fashion to interrupt the transmission of a data signal from transmitter 23 to optical fibers 70.

Illustrative values of the circuit parameters are set forth in FIGS. 2 and 3 for a receiver and collision detection circuit that is designed to operate with the current Ethernet standard of a maximum data rate of 10 megabits per second. For higher data rates, the MC-10116 line receiver chip should be replaced by an MC-10216 chip. The time constant of differentiator 43 should also be reduced so that any differentiated edge decays by approximately two time constants before the expected arrival of the next successive edge.

As will be apparent from the foregoing description, numerous modifications may be made within the spirit and scope of the invention. Preferably the invention is practiced using optical fibers as the communicating medium. However, other types of networks such as coaxial cable networks, microwave networks or free space optical systems may also be used.

As shown in FIG. 2, all but one of the amplifying stages of amplifier 42 are directly coupled to the preceding stage and a capacitive coupling is used between only two of the amplifying stages. The number of stages before and after the capacitor can be varied; however, it is desirable to use only a single capacitor in the amplifier and to use it as a DC block and a differentiator. Such use of the capacitor in the circuit of FIG. 2 is the primary reason that receiver 24 has such wide dynamic range.

The collision detection circuit is only illustrative. In the embodiment of FIG. 3, it includes a timing means, one-shot 61, for producing a timing signal that begins with the leading edge of a received data signal of a first polarity and continues for a period of time equal to the longest interval during which this signal is expected to have this first polarity, and comparing means, NAND gate 65, that compare the timing signal with the received data signal and produce a collision signal when the polarity of the received data signal remains the same for longer than the longest interval. Alternatively, the collision detection circuit could produce a timing signal equal to the shortest interval during which the received data signal is expected to have a first polarity and the comparing means could produce a collision signal if the polarity of the received data signal did not remain the same for the duration of said shortest interval. For example, to detect a data signal having a duration shorter than the shortest expected interval, one-shot 61 could be replaced by a one-shot that is triggered by the negative going edge of the data signal and produces an output pulse that is high for 50 - Δ nsec. where Δ is the timing tolerance allowed by the circuitry. All other elements of the circuitry could be the same.

As shown in the embodiment of FIG. 3, the collision detection signal advantageously is a high frequency signal having a frequency comparable to that of the maximum data rate of the communicating medium. Other signals, however, can be used.

What is claimed is:

1. A data communications system comprising:
    a communicating medium;
    a plurality of transceivers, each transceiver including
        transmitting means for transmitting data onto said medium and receiving means for receiving data communicated on said medium by another transceiver; and
    collision detecting means to which is applied a received data signal from said receiving means, said detecting means comprising:
        timing means for producing a timing signal commencing with the leading edge of the received data signal of a first polarity and continuing for a period of time equal to the longest interval during which the received data signal is expected to be of said first polarity, and
        means for comparing the timing signal with the received data signal from said receiving means and for producing a collision signal when the polarity of said received data signal remains the same for longer than said longest interval.

2. The apparatus of claim 1 wherein:
    the timing means is a one-shot,
    the collision signal is a high frequency signal having a frequency comparable to that of the maximum data rate of the communicating medium, and
    the comparing and producing means comprise a logic gate for comparing the timing signal from the one-shot with the received data signal, a second one-shot coupled to said logic gate for producing a second timing signal when the received data signal remains the same for longer than the longest interval, and means for generating said high frequency signal for a duration determined by said second one-shot.

3. A data communications system comprising:
    a communicating medium;
    a plurality of transceivers, each transceiver including
        transmitting means for transmitting data onto said medium and receiving means for receiving data communicated on said medium by another transceiver; and
    collision detecting means to which is applied a received data signal from said receiving means, said detecting means comprising:
        timing means for producing a timing signal commencing with the leading edge of the received data signal of a first polarity and continuing for a period of time equal to the shortest interval during which the received data signal is expected to be of said first polarity, and means for comparing the timing signal with the received data signal from said receiving means and for producing a collision signal when the polarity of said received data signal remains the same for less than said shortest interval.

4. The apparatus of claim 3 wherein:

the timing means is a one-shot, the collision signal is a high frequency signal having a frequency comparable to that of the maximum data rate of the communicating medium, and the comparing and producing means comprise a logic gate for comparing the timing signal from the one-shot with the received data signal, a second one-shot coupled to said logic gate for producing a second timing signal when the received data signal remains the same for less than the shortest interval, and means for generating said high frequency signal for a duration determined by said second one-shot.

5. A data communications system comprising:

a communicating medium;

a plurality of transceivers, each transceiver including transmitting means for transmitting data onto said medium and receiving means for receiving data communicated on said medium by another transceiver; and collision detecting means coupled to said communicating medium for generating a collision signal whenever a plurality of transceivers are transmitting signals onto said communicating medium;

at least one of said receiving means comprising:

an amplifier comprising a series of amplifying stages, all but one of which is directly coupled to the preceding stage and one of which is capacitively coupled by a capacitor that also functions as part of an RC differentiator, the stage or stages in advance of the capacitive coupling serving to amplify the data received from the communicating medium and the stage or stages subsequent to the capacitor serving to amplify peak signals produced by said differentiator, a Schmitt trigger to which are applied the peak signals produced at an output of the last stage of the amplifier, said Schmitt trigger producing a received data signal, and means for connecting the received data signal from said Schmitt trigger to said collision detecting means;

said collision detecting means comprising:

timing means for producing a timing signal commencing with the leading edge of the received data signal of a first polarity and continuing for a period of time equal to the longest interval during which the received data signal is expected to be of said first polarity, and means for comparing the timing signal with the received data signal from said Schmitt trigger and for producing a collision signal when the polarity of said received data signal remains the same for longer than said longest interval.

6. The apparatus of claim 5 wherein:

the timing means is a one-shot, the collision signal is a high frequency signal having a frequency comparable to that of the maximum data rate of the communicating medium, and the comparing and producing means comprise a logic gate for comparing the timing signal from the one-shot with the received data signal, a second one-shot coupled to said logic gate for producing a second timing signal when the received data signal remains the same for longer than the longest interval, and means for generating said high frequency signal for a duration determined by said second one-shot.

7. The apparatus of claim 5 wherein:

the timing means is a one-shot, the collision signal is a high frequency signal having a frequency comparable to that of the maximum data rate of the communicating medium, and the comparing and producing means comprise a logic gate for comparing the timing signal from the one-shot with the received data signal, a second one-shot coupled to said logic gate for producing a second timing signal when the received data signal remains the same for less than the shortest interval, and means for generating said high frequency signal for a duration determined by said second one-shot.

8. The apparatus of claim 5 further comprising means for biasing one of said amplifying stages so that when said transceiver is initially turned on the output of said Schmitt trigger is in a state indicating that no signal is being communicated on said communicating medium.

9. The apparatus of claim 5 wherein one of the amplifying stages is a differential amplifier having first and second inputs, each of said inputs being connected respectively to first and second capacitors which in turn are connected respectively by first and second resistors to a voltage supply that is activated when said receiving means is turned on, said first resistor and first capacitor having a time constant different from the time constant of said second resistor and said second capacitor, said time constants being sufficiently different that when said receiver is first turned on, the voltage developed across said first and second capacitors are sufficiently different as to generate a voltage such that said Schmitt trigger turns on in a state that corresponds to the absence of a signal on said communicating medium.

10. A data communications system comprising:

a communicating medium;

a plurality of transceivers, each transceiver including transmitting means for transmitting data onto said medium and receiving means for receiving data communicated on said medium by another transceiver; and collision detecting means coupled to said communicating medium for generating a collision signal whenever a plurality of transceivers are transmitting signals onto said communicating medium;

at least one of said receiving means comprising:

an amplifier comprising a series of amplifying stages, all but one of which is directly coupled to the preceding stage and one of which is capacitively coupled by a capacitor that also functions as part of an RC differentiator, the stage or stages in advance of the capacitive coupling serving to amplify the data received from the communicating medium and the stage or stages subsequent to the capacitor serving to amplify peak signals produced by said differentiator, a Schmitt trigger to which are applied the peak signals produced at an output of the last stage of the amplifier, said Schmitt trigger producing a received data signal, and means for connecting the received data signal from said Schmitt trigger to said collision detecting means;

said collision detecting means comprising:

timing means for producing a timing signal commencing with the leading edge of the received data signal of a first polarity and continuing for a period of time equal to the shortest interval during which the received data signal is expected to be of said first polarity, and means for comparing the timing signal with the received data signal from said Schmitt trigger and for producing a collision signal when the polarity of said received data signal remains the same for less than said shortest interval.

11. The apparatus of claim 10 further comprising means for biasing one of said amplifying stages so that when said transceiver is initially turned on the output of said Schmitt trigger is in a state indicating that no signal is being communicated on said communicating medium.

12. The apparatus of claim 10 wherein one of the amplifying stages is a differential amplifier having first and second inputs, each of said inputs being connected respectively to first and second capacitors which in turn are connected respectively by first and second resistors to a voltage supply that is activated when said receiving means is turned on, said first resistor and first capacitor having a time constant different from the time constant of said second resistor and said second capacitor, said time constants being sufficiently different that when said receiver is first turned on, the voltage developed across said first and second capacitors are sufficiently different as to generate a voltage such that said Schmitt trigger turns on in a state that corresponds to the absence of a signal on said communicating medium.

* * * * *